United States Patent
Lin

(10) Patent No.: US 7,215,523 B2
(45) Date of Patent: May 8, 2007

(54) APPARATUS FOR PROTECTING AN INTEGRATED CIRCUIT AND METHOD THEREOF

(75) Inventor: Chih-Yuan Lin, Nantou (TW)

(73) Assignee: Benq Corporation, Taoyuan Shien (TW)

(*) Notice: Subject to any disclaimer, the term of this patent is extended or adjusted under 35 U.S.C. 154(b) by 0 days.

(21) Appl. No.: 10/999,163

(22) Filed: Nov. 29, 2004

(65) Prior Publication Data

US 2005/0117266 A1 Jun. 2, 2005

(30) Foreign Application Priority Data

Nov. 28, 2003 (TW) .............. 92133552 A

(51) Int. Cl.
- *H02H 3/20* (2006.01)
- *H02H 9/04* (2006.01)
- *H05B 41/285* (2006.01)
- *H05B 41/36* (2006.01)

(52) U.S. Cl. .............. 361/91.1; 361/91.3; 361/91.1; 307/38; 307/39; 315/178; 315/182; 315/199; 315/250; 315/209 T

(58) Field of Classification Search ........... 361/91, 361/91.1, 91.3; 315/209 T, 178, 182, 199, 315/250; 307/38

See application file for complete search history.

(56) References Cited

U.S. PATENT DOCUMENTS 4,455,510 A * 6/1984 Lesko .............. 315/263
4,885,671 A * 12/1989 Peil .............. 363/17
6,456,474 B2 9/2002 Yasumori .............. 361/91.5

FOREIGN PATENT DOCUMENTS

| GB | 2251740 A | * 7/1992 |
| JP | 06-236693 | 8/1994 |

* cited by examiner

Primary Examiner—Brian Sircus
Assistant Examiner—F Ritz
(74) Attorney, Agent, or Firm—Thomas, Kayden, Horstemeyer & Risley

(57) ABSTRACT

An apparatus for protecting an integrated circuit is applied to an electrical apparatus having a control unit. The control unit is used for controlling the integrated circuit and the protecting apparatus. The protecting apparatus includes a power input terminal, a power output terminal, and a control terminal. The power input terminal is used for receiving a power, and the power output terminal is used for outputting the power to the integrated circuit. The control terminal is used for receiving a control voltage of the control unit. When the control unit is at the power on mode, the control unit outputs the control voltage of a first level to prevent the power being input to the integrated circuit. Over a predetermined period of time, the control unit outputs the control voltage of a second level, so that the power can be input to the integrated through the protecting apparatus.

11 Claims, 3 Drawing Sheets

APPARATUS FOR PROTECTING AN INTEGRATED CIRCUIT AND METHOD THEREOF

This application claims the benefit of Taiwan application Serial No. 92133552, filed Nov. 28, 2003, the subject matter of which is incorporated herein by reference.

BACKGROUND OF THE INVENTION

1. Field of the Invention

The invention relates in general to an apparatus for protecting an integrated circuit and method thereof, and more particularly to an apparatus for protecting an integrated circuit, which can prevent the latch up of the integrated circuit by controlling the power input to the integrated circuit and method thereof.

2. Description of the Related Art

Referring to FIG. 1, a structural diagram of a conventional projector is shown. The conventional projector 100 includes a lamp 110, a lamp igniter 120, a microprocessor 130, and an integrated circuit 140. The lamp igniter 120 controlled by the microprocessor 130, uses an instant high voltage of 25,000 V approximately to ignite the lamp 110. Normally the integrated circuit 140 is an application specific integrated circuit (ASIC), which is controlled by the microprocessor 230 and performs various operations, such as driving the fan, under power on mode. The integrated circuit 140 receives power from the power source 150 via power source pins (not shown in the figure).

Normally, the projector 100 is at standby mode as switched on. Meanwhile, power of the power source 150 is inputted to the microprocessor 130 and the integrated circuit 140, the lamp igniter 120 has not ignited the lamp 110, neither has the integrated circuit 140 been driven to perform various operations. When the projector 100 enters the above-mentioned power on mode, the lamp igniter 120 will ignite the lamp 110, and the microprocessor 130 will send a signal instructing the integrated circuit 140 to perform normal operations. However, the instant high voltage required for igniting the lamp will generate a large amount of electromagnetic waves, which will easily enter the integrated circuit 140 via the power pins along with power output by the power source 150. Having a high voltage of 100 V approximately, the electromagnetic waves will reduce the impedance between the power pins of the integrated circuit and the ground level to be below 100 ohms, which is almost short-circuited, and causes the integrated circuit 140 to be latched up. After the integrated circuit 140 has been latched up, if the power source 150 still continues to supply power, the integrated circuit 140 will be penetrated and damaged by a large amount of currents accordingly.

In the prior art, a capacitance is installed at the power pins of the integrated circuit 140 to filter noises. However, the electromagnetic wave (100 V approximately) generated by the instant high voltage cannot be filtered without using a large amount of capacitance or a large capacitor, not only is it uneconomic but ineffective. Besides, an iron piece or a copper piece can be disposed on the peripheral of the integrated circuit to prevent the radiation of the electromagnetic waves. However, such mechanism has several limitations and has a complicated design.

SUMMARY OF THE INVENTION

It is therefore an object of the invention to provide an apparatus for protecting an integrated circuit and method thereof. The protecting apparatus is controlled by the control unit. When the control unit is at standby mode, the protecting apparatus will not be switched on and the power cannot be inputted to the integrated circuit. After having been at power on mode over a predetermined period of time, the control unit will power on the protecting apparatus, so that the power can be inputted to the integrated circuit and that the electromagnetic waves will be prevented from entering the integrated circuit along with the power and causing the integrated circuit to be latched up.

According to the object of the invention, a apparatus for protecting an integrated circuit applied in an electronic apparatus is provided. The electronic apparatus includes a control unit for controlling an integrated circuit. The protecting apparatus according to the invention includes a power input terminal, a power output terminal, and a control terminal. The power input terminal is for receiving the power; the power output terminal is for outputting the power to the integrated circuit, and the control terminal is for receiving a control voltage of the control unit for controlling the input of the power to the integrated circuit. When the control unit is at power on mode, the control voltage will be of a first level and the power cannot be inputted to the integrated circuit. After the control unit has been at power on mode over a predetermined period of time, the control voltage will be of a second level and the power will be outputted to the integrated circuit through the protecting apparatus of the invention, effectively preventing the integrated circuit from being latched up.

According to the object of the invention, a projector including a lamp, a lamp igniter, an integrated circuit, a control unit, and a protecting apparatus is provided. The lamp igniter is for using an instant high voltage to ignite the lamp. The control unit is for controlling the lamp igniter and the integrated circuit and outputting a control voltage. When the control unit is at standby mode, the control voltage will be of a first level, and after the lamp has been ignited by the lamp igniter for a predetermined period of time, 20 seconds for instance, the control voltage will be of a second level. The protecting apparatus is for receiving the control voltage and controls the output of a power to the integrated circuit. When the control voltage is of a first level, the power cannot be inputted to the integrated circuit. When the control voltage is of a second level, the power is outputted to the integrated circuit through the protecting apparatus, effectively preventing the integrated circuit from the interference of electromagnetic waves.

According to the object of the invention, a method for protecting the integrated circuit applied in an electronic apparatus is provided. The electronic apparatus includes a control unit for driving the integrated circuit at power on mode. The integrated circuit is driven by a power. The method includes preventing the power from being inputted to the integrated circuit when the control unit has been at power on mode; and providing the power to the integrated circuit after the control unit has been at power on mode over a predetermined period of time. The control unit uses a transistor to control the power input to the integrated circuit.

When the control unit is at power on mode, the control unit will output a voltage of a first level to the gate of the transistor, so that the power cannot be inputted to the integrated circuit through the transistor. After the control unit has been at power on mode over the predetermined period of time, the control unit will output a voltage of a second level, so that the power source can be inputted to the integrated circuit through the transistor. Therefore, a large amount of electromagnetic waves generated when the electronic apparatus is at power on mode will be prevented from entering the integrated circuit and causing damage to the integrated circuit.

Other objects, features, and advantages of the invention will become apparent from the following detailed description of the preferred but non-limiting embodiments. The following description is made with reference to the accompanying drawings.

DETAILED DESCRIPTION OF THE INVENTION

The key feature of the invention lies in using a protecting apparatus to control the power input to the integrated circuit. When the control unit is at standby mode, the protecting apparatus will not be switched on and the power cannot be inputted to the integrated circuit. After having been at power on mode for a predetermined period of time, the control unit will switch on the protecting apparatus, so that the power from the power source can be inputted to the integrated circuit. Therefore, the large amount of electromagnetic waves generated when the system is at power on mode will not enter and latch up the integrated circuit along with the power output by the power source.

Figure 1:
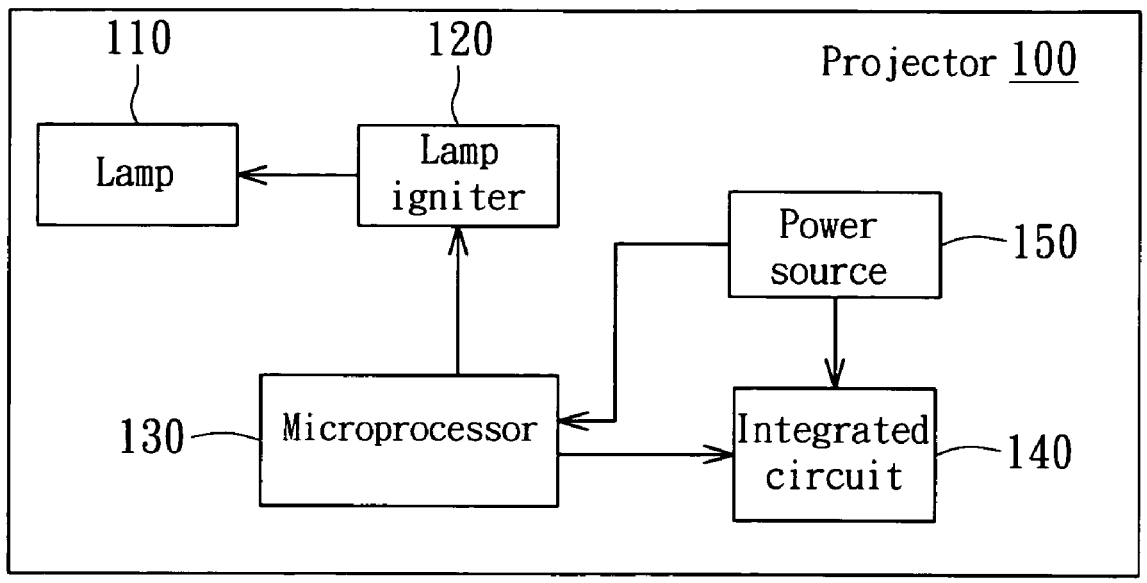
FIG. 1 is a structural diagram of a conventional projector.
Figure 2A:
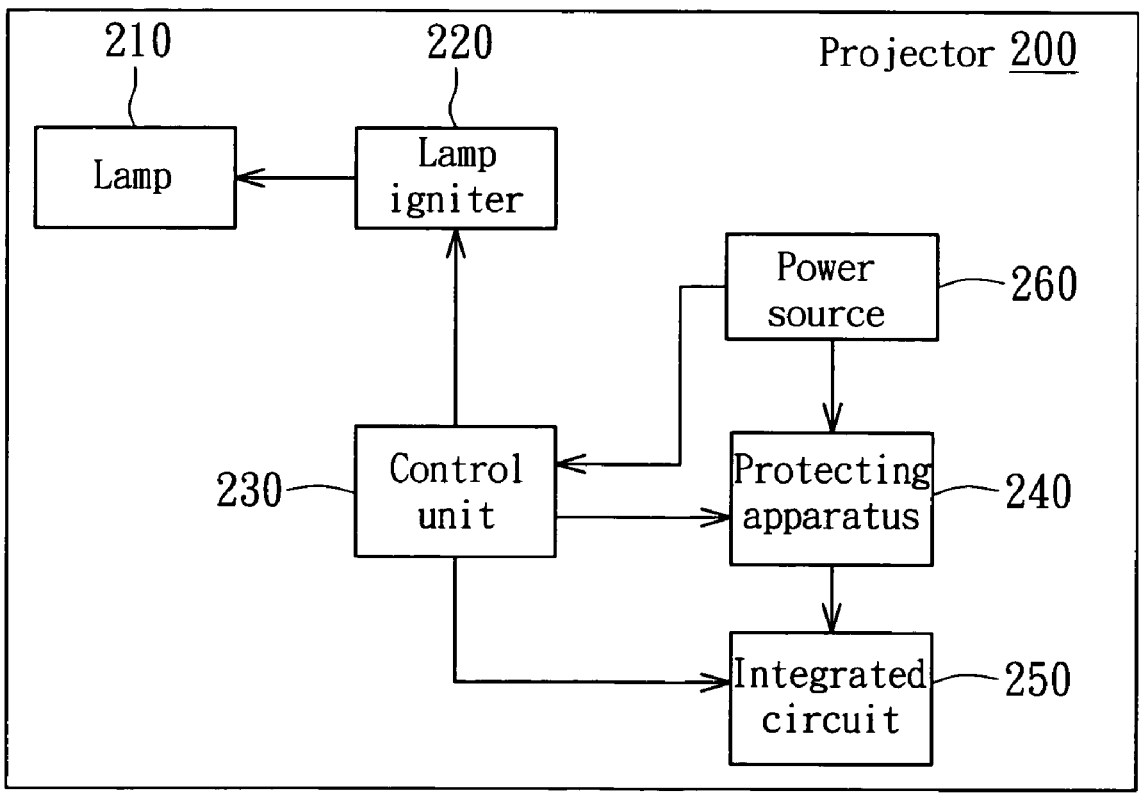
FIG. 2A is a structural diagram of a projector according to a preferred embodiment of the invention.

The apparatus for protecting the integrated circuit according to the invention is exemplified by a projector disclosed below. Referring to FIG. 2A, a structural diagram of a projector according to a preferred embodiment of the invention is shown. The projector 200 includes a lamp 210, a lamp igniter 220, a control unit 230, a protecting apparatus 240, and an integrated circuit 250. The lamp igniter 220, controlled by the control unit 230, uses an instant high voltage to ignite the lamp 210. The protecting apparatus 240, controlled by the control unit 230, is used for controlling the input of power of the power source 260 to the integrated circuit 250. The control unit 230 can be a microprocessor, and the integrated circuit 250 can be an application specific integrated circuit, which is controlled by the control unit 230 to perform various operations, such as driving the fan under power on mode. When the projector 200 is at standby mode, the protecting apparatus 240 is not switched on, the power of the power source 260 can be supplied to the control unit 230 but not to the integrated circuit 250. After the projector 200 has been at power on mode and the lamp 210 has been ignited by the lamp igniter 220 for a predetermined period of time, the protecting apparatus 240 will be switched on. Meanwhile, the power source 260 will be able to output power to the integrated circuit 250 through the protecting apparatus 240.

Figure 2B:
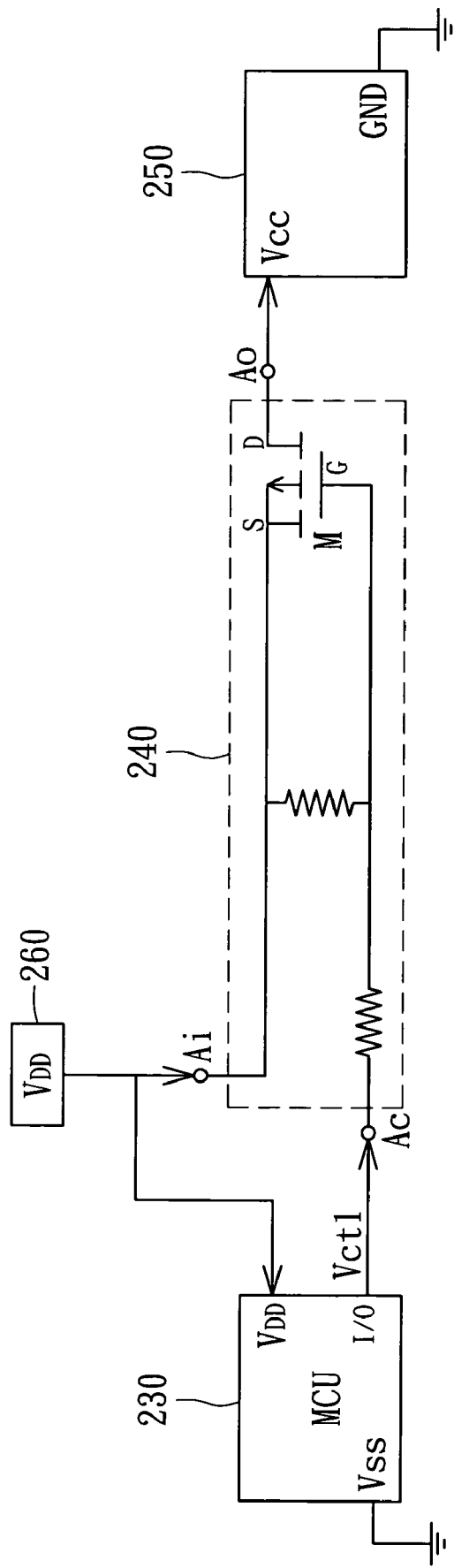
FIG. 2B is a circuit diagram showing how the protecting apparatus couples the control unit and the integrated circuit in FIG. 2A.

Referring to FIG. 2B, a circuit diagram showing how the protecting apparatus 240 couples the control unit 230 and the integrated circuit 250 in FIG. 2A is shown. The protecting apparatus 240 includes a P-typed metal oxide semiconductor (MOS) transistor (or PMOS transistor) M. The protecting apparatus 240 includes a power input terminal Ai, a power output terminal Ao, and a control terminal Ac. The power input terminal Ai couples the source S of the transistor M to receive the power from the power source 260 ($V_{DD}$). The power output terminal Ao couples the drain D of the transistor M to output the power source 260 to the integrated circuit 250. The control terminal Ac couples the gate G of the transistor M to receive a control voltage Vctl outputted from an I/O terminal of the control unit 230 for controlling the input of power to the integrated circuit 250 from the power source 260. When the control voltage Vctl is of a high level, the PMOS transistor M will not be conducted, so the power of the power source 260 cannot be inputted to the integrated circuit 250, whereas when the control voltage Vctl is of a low level, the PMOS transistor M will be conducted and the power of the power source 260 can be outputted to the power pins Vcc of the integrated circuit 250 through the protecting apparatus 240.

Figure 2C:
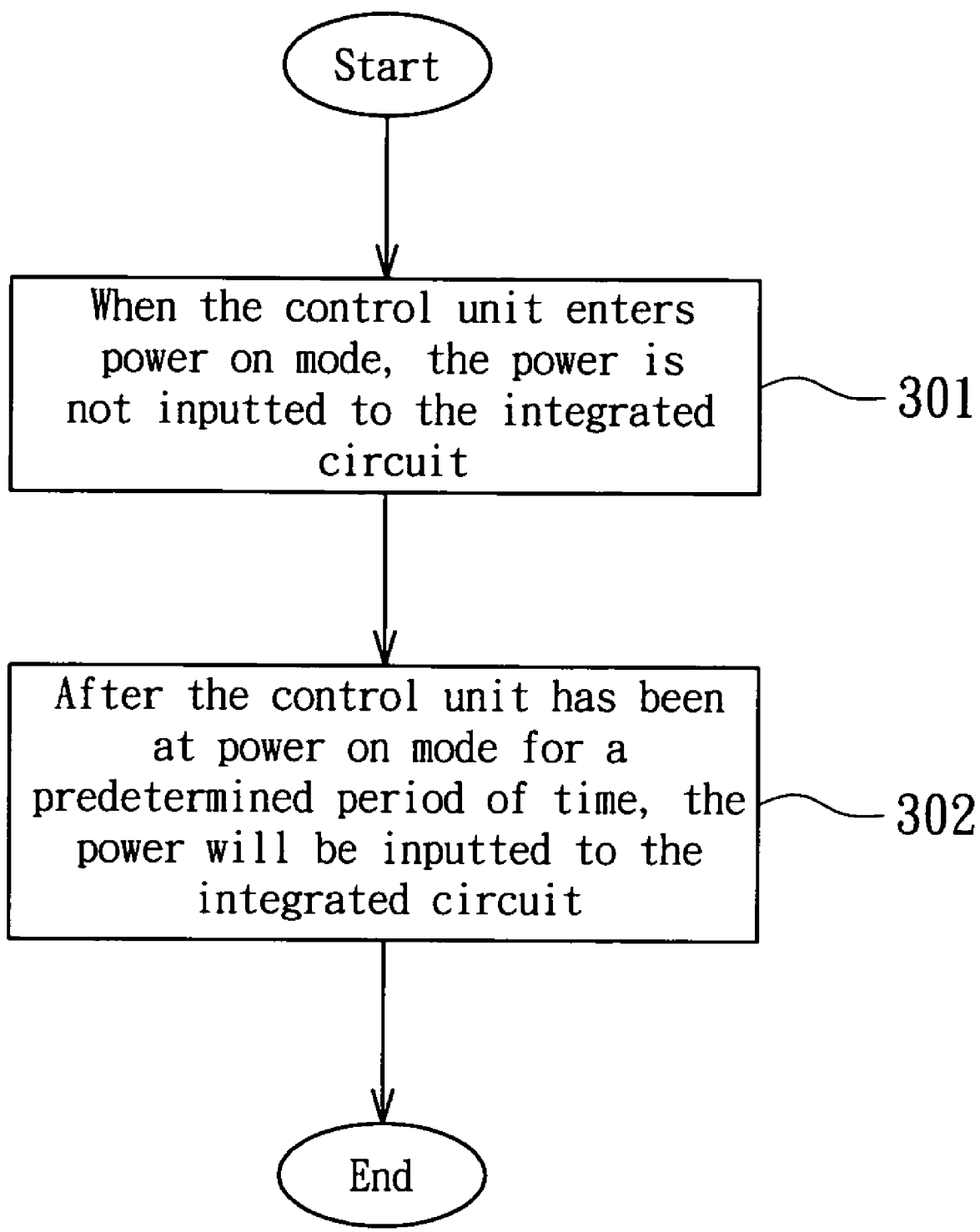
FIG. 2C is a flowchart of the method for protecting the integrated circuit according to a preferred embodiment of the invention.

Referring to FIG. 2C, a flowchart of the method for protecting the integrated circuit according to a preferred embodiment of the invention is shown. In the step 301, when the lamp igniter 220 uses an instant high voltage to ignite the lamp 210 and the control unit 230 is at power on mode, the control unit 230 will disable the protecting apparatus 240 so the power of the power source 260 will not be inputted to the integrated circuit 250. When the control unit 230 shifts from the above-mentioned standby mode to be at power on mode, a large amount of electromagnetic waves will be generated because the lamp igniter 220 uses an instant high voltage to ignite the lamp 210. The invention uses the design of the protecting apparatus 240, which sets the control voltage Vctl outputted by the control unit 230 to be of high level when the control unit 230 is at power on mode, so that the transistor M of the protecting apparatus 240 will not be conducted and that the power source 260 cannot be inputted to the integrated circuit 250 through the protecting device 240. The large amount of electromagnetic waves will be prevented from entering the integrated circuit 250 along with the power output by the power source 260 and causing damage to the integrated circuit 250.

Next, proceed to the step 302. After the control unit 230 has been at power on mode for a predetermined period of time, the control unit 230 will enable the protecting apparatus 240 so that the power of the power source 260 can be inputted to the integrated circuit 250. After the control unit 230 has been at power on mode for a predetermined period of time, the large amount of electromagnetic waves generated inside the projector 200 will gradually reduce and disappear. Generally speaking, the predetermined period of time is approximately 20 seconds. At this time, the control voltage Vctl outputted by the control unit 230 is set to be of low level, so that the transistor M of the protecting apparatus 240 will be conducted and that the power source 260 can supply power to the integrated circuit 250 through the protecting apparatus 240 and supply an operating voltage Vcc necessary for the normal operation of the integrated circuit 250.

Despite the invention is exemplified by the projector 200 in the above-mentioned preferred embodiment, the invention can be applied in any electronic apparatus with a control unit and an integrated circuit to protect the integrated circuit thereof. Although the protecting apparatus 240 is exemplified by using a PMOS transistor M as a switch unit, the protecting apparatus 240 of the invention can use an NMOS transistor as the switch unit as well. Incorporated by the design of the control voltage Vctl of the control unit 230, the protecting apparatus 240 will not be powered on when the control voltage is of high level but will be powered on when the control voltage is of low level. The invention may also use other digital switches controlled by the microprocessor to control the power input to integrated circuit. As long as the requirement of preventing the integrated circuit latched up can be achieved, it will not deviate from the scope of the invention.

According to the above-mentioned preferred embodiment, the invention has the following advantages. A simplistic circuit of the protecting apparatus is used to control the input of power to the integrated circuit from the power source. With the design of the control voltage of the control unit, the power source cannot supply power to the integrated circuit as the control unit is at standby mode while it can supply power to the integrated circuit after the control unit has been at power on mode for a predetermined period of time. Therefore, the electromagnetic waves generated when the system is at power on mode will be effectively prevented from entering the integrated circuit along with the power output by the power source and causing the integrated circuit to be latched up.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projector, comprising:
   a light generating source;
   a control unit outputting a control voltage, wherein, the control voltage is at a first level when the light generating source is off, and after the light generating source has been switched on for a predetermined period of time, the control voltage changes to a second level from the first level;
   a non-lamp-igniter electrical circuit;
   an integrated circuit for controlling the non-lamp-igniter electrical circuit; and
   a protecting circuit selectively coupling a power from a power source to the integrated circuit in response to the control voltage, wherein when the control voltage is at the first level, the protecting circuit isolating the power from the integrated circuit; and when the control voltage is at the second level, the protecting circuit coupling the power from the power source to the integrated circuit, so that the integrated circuit receives the power through the protecting circuit after the light generating source has been switched on for a predetermined period of time.

2. The projector according to claim 1, wherein the protecting circuit comprises a MOS transistor, the transistor comprises a gate, a first source/drain, and a second source/drain, the gate is controlled by the control voltage, the first source/drain is for receiving the power, and the second source/drain couples the integrated circuit.

3. The projector according to claim 2, wherein the first level is a low level and the second level is a high level.

4. The projector according to claim 1, wherein the light generating source comprises a lamp and a lamp igniter, the lamp igniter uses an instant high voltage to ignite the lamp, the larger amount of electromagnetic waves generated by the lamp as ignited by the lamp igniter will not enter the integrated circuit along with the power.

5. The projector according to claim 1, wherein the predetermined period of time is approximately 20 seconds.

6. A method for protecting the integrated circuit, applied in an electronic apparatus, the electronic apparatus comprising a light generating source, a control unit, a non-lamp-igniter electrical circuit, an integrated circuit, and a protecting circuit, the integrated circuit for controlling the non-lamp-gigniter electrical circuit, the method comprising:
   generating a control voltage by the control unit, wherein, the control voltage is at a first level when the light generating source is off, and after the light generating source has been switched on for a predetermined period of time, the control voltage changes to a second level from the first level; and
   isolating the power from the integrated circuit by the protecting circuit in response to the control voltage which is at the first level, and coupling the power from a power source to the integrated circuit by the protecting circuit in response to the control voltage which is at the second level, so that the integrated circuit receives the power through the protecting circuit after the light generating source has been switched on for a predetermined period of time.

7. The method according to claim 6, wherein the control unit is at a standby mode before entering a power on mode, and when the control unit is at the standby mode, the protecting circuit is disabled, and the power cannot be inputted to the integrated circuit.

8. The method according to claim 6, wherein the protecting circuit has a transistor for controlling the power input to the integrated circuit.

9. The method according to claim 8, wherein when the control unit enters a power on mode, the control unit outputs the control voltage of the first level to the gate of the transistor, so that the power cannot be inputted to the integrated circuit through the transistor; and after the control unit has entered the power on mode for the predetermined period of time, the control unit outputs the control voltage of the second level, so that the power can be inputted to the integrated circuit through the transistor.

10. The method according to claim 1, wherein non-lamp-igniter electrical circuit is a fan.

11. A projector, comprising:
    a lamp igniter using a high voltage to selectively ignite a lamp;
    a non-light-igniter electrical circuit;
    a non-light-igniter control circuit for controlling the non-light-igniter electrical circuit;
    a protecting circuit selectively coupling a power source to the non-light-igniter control circuit; and
    a control unit electrically connected to the light igniter and the protecting circuit, the control unit disables the light igniter when the control unit is in standby mode, and the control unit enables the light igniter when the control unit is in power on mode;
    wherein when the lamp is ignited by the lamp igniter, the control unit disables the protecting circuit to isolate the power source from the non-light-igniter electrical control circuit:
    wherein after the lamp has been ignited by the lamp igniter for a predetermined period of time, the control unit enables the protecting circuit to couple the power source to the non-light-igniter electrical control circuit.

* * * * *